United States Patent
Beaudin et al.

(10) Patent No.: US 11,169,916 B2
(45) Date of Patent: Nov. 9, 2021

(54) EXCEPTION HANDLING IN WIRELESS ACCESS POINTS

(71) Applicant: Hewlett Packard Enterprise Development LP, Houston, TX (US)

(72) Inventors: Andre Beaudin, St. Laurent (CA); Mohd Shahnawaz Siraj, San Jose, CA (US); Qiang Zhou, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 424 days.

(21) Appl. No.: 16/139,770

(22) Filed: Sep. 24, 2018

(65) Prior Publication Data
US 2020/0097395 A1 Mar. 26, 2020

(51) Int. Cl.
*G06F 12/02* (2006.01)
*H04L 29/08* (2006.01)
(Continued)

(52) U.S. Cl.
CPC ........ *G06F 12/0246* (2013.01); *G06F 9/3861* (2013.01); *G06F 9/5016* (2013.01);
(Continued)

(58) Field of Classification Search
CPC .... G06F 9/3861; G06F 9/4812; G06F 9/5016; G06F 9/5027; G06F 12/0246; G06F 12/0638; G06F 12/08; G06F 12/109; G06F 2209/481; G06F 2212/1016; G06F 2212/1044; G06F 2212/2022; G06F 2212/657; H04W 84/12; H04W 88/085
See application file for complete search history.

(56) References Cited

U.S. PATENT DOCUMENTS 7,069,470 B2 6/2006 Wilding et al.
7,383,471 B2 6/2008 Dall
(Continued)

FOREIGN PATENT DOCUMENTS

WO 2009/074778 A1 6/2009

OTHER PUBLICATIONS

Bailey, C. et al., Debugging from Dumps, (Research Paper), Mar. 15, 2011, 34 Pgs.

*Primary Examiner* — Aracelis Ruiz
(74) *Attorney, Agent, or Firm* — Hewlett Packard Enterprise Patent Department

(57) ABSTRACT

Example method includes: allocating, by a main processor of a wireless access point (WAP) comprising at least the main processor and a plurality of co-processors wherein the main processor and the plurality of co-processors both have access to a random-access memory (RAM) co-located within the WAP, a dedicated non-overlapping segment of the RAM to each of the plurality of the co-processors; receiving, by the main processor of the WAP, a notification from one of the plurality of co-processors indicating that an exception previously defined by the one of the plurality of co-processors has occurred; determining, by the main processor of the WAP, the dedicated non-overlapping segment of the RAM allocated to the one of the plurality of co-processors; and saving, by the main processor of the WAP, the dedicated non-overlapping segment of the RAM allocated to the one of the plurality of co-processors to a fast access memory.

20 Claims, 6 Drawing Sheets

(51) Int. Cl.
*G06F 9/50* (2006.01)
*G06F 9/38* (2018.01)
*H04W 88/08* (2009.01)

(52) U.S. Cl.
CPC ............ *G06F 9/5027* (2013.01); *H04L 67/06* (2013.01); *H04L 67/34* (2013.01); *G06F 2212/2022* (2013.01); *H04W 88/085* (2013.01)

(56) References Cited

U.S. PATENT DOCUMENTS

| | | |
|---|---|---|
| 2005/0015579 A1 | 1/2005 | Grover et al. |
| 2008/0126652 A1* | 5/2008 | Vembu .................... G06F 13/24 710/268 |
| 2009/0074778 A1 | 6/2009 | Fitzgerald |
| 2010/0306463 A1* | 12/2010 | Nakamura .......... G06F 12/0842 711/113 |
| 2016/0276008 A1* | 9/2016 | Saida .................... G11C 29/023 |
| 2018/0039523 A1* | 2/2018 | Akamine .............. G06F 9/5044 |
| 2018/0113811 A1* | 4/2018 | Xing .................. G06F 12/1009 |

* cited by examiner

EXCEPTION HANDLING IN WIRELESS ACCESS POINTS

BACKGROUND

With the advent of IEEE 802.11ax standards and other advanced high throughput wireless technologies, many wireless chipset vendors have turned to incorporating multiple co-processors in their designs in order to offload time sensitive and/or repetitive tasks from main processor of the wireless access points (WAPs) and Ethernet. These wireless chipset vendors have also incorporated high quantity random access memory (RAM) in their designs to satisfy the high throughputs, the large number of users, etc., in the network. On the other hand, price for persistence storage is quite expensive compared to the RAM quantity. The present disclosure provides example solutions for exception handling in the WAPs whose RAM quantity exceeds the amount of persistence storage.

BRIEF DESCRIPTION OF THE DRAWINGS

The following detailed description references the drawings, wherein.

DETAILED DESCRIPTION

Figure 1:
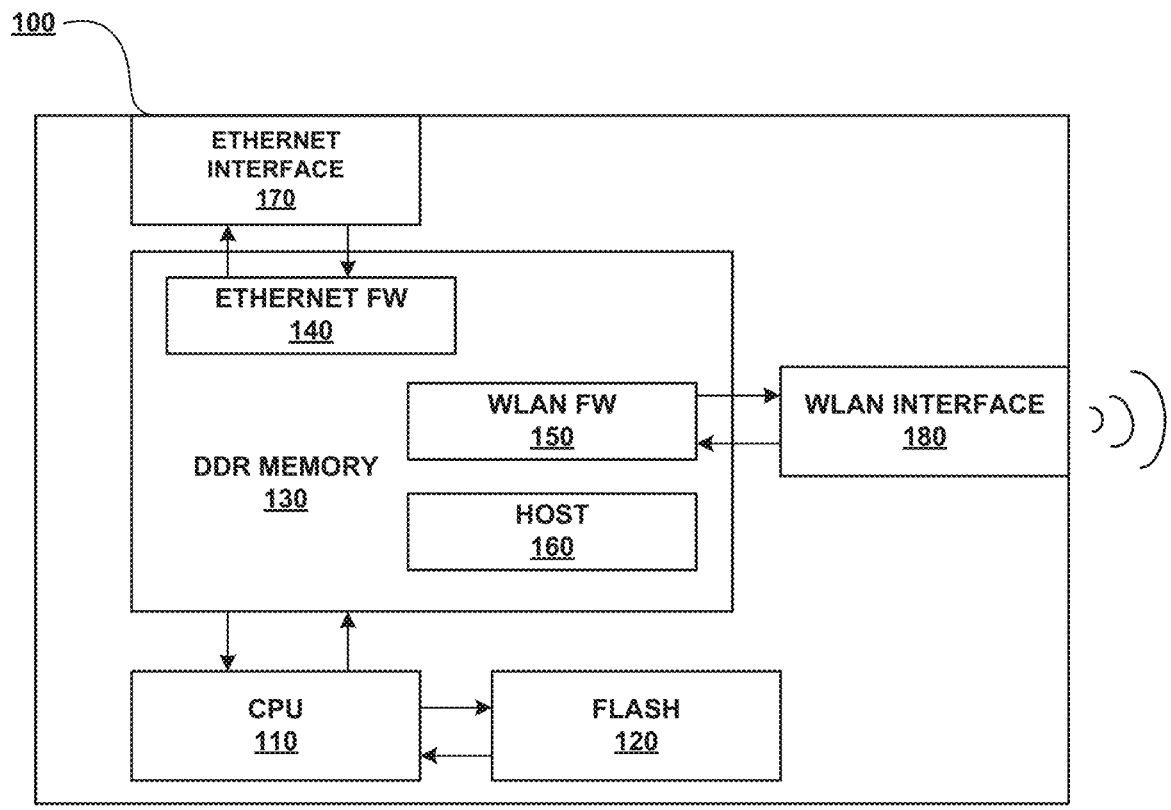
FIG. 1 is a block diagram of an example system architecture for exception handling in wireless access points (WAPs) according to the present disclosure.

In a wireless local area network (WLAN) architecture as specified in IEEE 802.11ax standards, a WAP device may include a single main processor and multiple co-processors. The co-processors can be used to offload specific tasks to satisfy the performance (e.g., the WLAN throughput) specifications in the IEEE 802.11ax standards. For example, a co-processor can link traffic from a wireless interface to an Ethernet interface such that traffic can be passed directly from the wireless network to the Ethernet. The main processor can manage generic tasks, such as authentication of WLAN clients, association of the WLAN clients, configurations of the WAPs, etc. All of the co-processors and the main processor in the IEEE 802.11ax specified architecture share access to the same double data rate (DDR) random-access memory.

According to IEEE 802.11ax standards, a WAP may support up to 2,048 client devices, which may consume a large amount of RAM (e.g., 1-2 GB). For a WAP in a conventional WLAN architecture, when an exception occurs, the main processor can take an image of the entire RAM, which generally measures up to 256 MB, and store the image in the persistence storage prior to handling the exception. The stored image would include complete information for analyzing the source of exception. The substantial increase in the RAM size of the WAPs per the new IEEE 802.11ax standards results in a relatively high amount of RAM and a relatively low amount of persistence storage in the WAPs. As such, when an exception occurs, the main processor cannot store the complete image of the RAM in the persistence storage due to the increased RAM size. The present disclosure describes example solutions that support exception handling by the WAPs in the new WLAN architecture as specified in IEEE 802.11ax. It worth noting that although the present disclosure uses IEEE 802.11ax specified WLAN architecture as an example, the example solutions described herein can be applied to any existing or future alternative architectures in which exception handling is thwarted by the discrepancy between the size of RAM and the size of persistence storage.

As used herein, 'access point' (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like. For example, a "network device may refer to a network controller that comprises a hardware or a combination of hardware and software that enables connection between client devices and computer networks. In some implementations, a network device may refer to a server computing device (e.g., on-premise server, private, public, or hybrid cloud server) that comprises a hardware or a combination of hardware and software that can process and/or display network-related information. In some implementations, a network device may refer to an access point acting as a virtual master network controller among a cluster of access points.

Referring now to FIG. 1, a WAP 100 may include a central processing unit (CPU) 110, which may include a main processor and a plurality of co-processors. For example, the co-processors may include, but are not limited to, a first co-processor dedicated to process client traffic through a WLAN interface 180, a second co-processor dedicated to process client traffic through an Ethernet interface 170, a third co-processor dedicated to offload certain host functionalities in order to satisfy the standard specifications. The co-processors and the main processor of CPU 110 share access to a DDR memory 130. In particular, DDR memory 130 may include a first segment 150 for storing WLAN firmware, a second segment 140 for storing Ethernet firmware, a third segment 160 for storing instructions to execute host functionalities. Further, WLAN firmware may communicate through WLAN interface 180, and Ethernet firmware may communicate through Ethernet interface 170. In addition, CPU 110 is communicatively coupled to a persistence memory, e.g., flash memory 120. As mentioned previously, the size of flash memory 120 is much smaller than the size of DDR memory 130 in a WAP compliant with the IEEE 802.11ax standards. However, flash memory 120 is co-located with the main processor and the plurality of co-processors in CPU 110. Therefore, flash memory 120 provides significantly faster memory access to the main processor and the plurality of co-processors in CPU 110.

In an example WLAN architecture compliant with IEEE 802.11ax standards, each co-processor may have its own unique and reserved virtual RAM segment. Each virtual RAM segment comprises a plurality of RAM spaces with consecutive and/or non-consecutive physical memory addresses, whereas the RAM spaces in each virtual RAM segment are accessible only to the main processor and a single co-processor corresponding to the virtual RAM segment. Furthermore, each co-processor may create its own set of exceptions. When an exception (esp. a co-processor created exception) occurs, the WAP cannot copy the content of the entire RAM (e.g., DDR memory 130) to the persistence storage (e.g., flash memory 120) to analyze the source of the exception due to the limited size of the persistent storage. Also, if an exception occurs in the WAP's co-processor, the WAP cannot transfer DDR memory dump, because the pertinent co-processor is in an exception state, thus network connectivity is not available.

Figure 2:
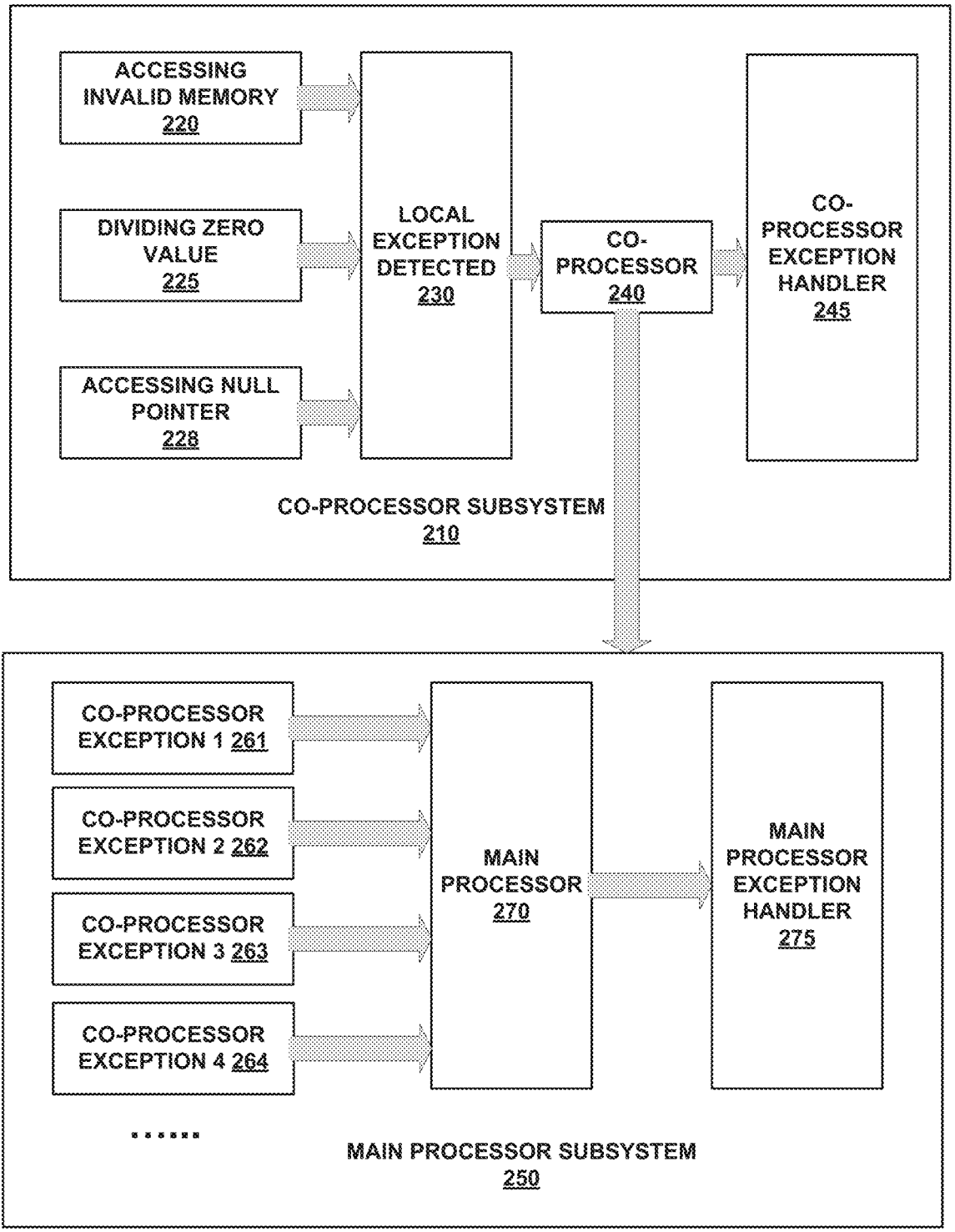
FIG. 2 is a block diagram of an example exception handling in WAPs according to the present disclosure.

FIG. 2 illustrates a block diagram of an example exception handling in WAPs according to the present disclosure. Specifically, FIG. 2 includes a single main processor subsystem 250 and a plurality of co-processor subsystems including, e.g., co-processor subsystem 210. Each co-processor subsystem (e.g., co-processor subsystem 210) includes a co-processor (e.g., co-processor 240). Furthermore, a plurality of local exceptions may be defined in the co-processor subsystem. In the example illustrated in FIG. 2, at least three local exceptions, e.g., accessing invalid memory 220, dividing zero value 225, accessing null pointer 228, etc., may occur in co-processor subsystem 210. In FIG. 2, local exceptions (e.g., accessing invalid memory 220, dividing zero value 225, accessing null pointer 228, etc.) are defined by co-processor 240. After the co-processor 240 defines the local exceptions, co-processor 240 notifies main processor subsystem 270 of the local exceptions. Note that although only three exceptions are depicted in FIG. 2, any number of local exceptions may be defined in a co-processor subsystem. In some examples, the sets of local exceptions occurring at different co-processor systems of the same WAP may be identical to each other. In some examples, the sets of local exceptions occurring at different co-processor systems of the WAP may be overlapping with each other. In other examples, the sets of local exceptions occurring at different co-processor systems of the WAP may be different and non-overlapping with each other.

During runtime operations, when a previously defined local exception is detected 230 by co-processor subsystem 210, the co-processor subsystem 210 may pass the local exception to the co-processor 240. The co-processor 240 can then pass the local exception to the co-processor exception handler 245 for local exception handling, and also notify main processor subsystem 250 of the exception. Specifically, when a particular local exception is detected by co-processor subsystem 210, instructions corresponding to the particular local exception in the related co-processor exception handler 245 can be executed by co-processor 230 to collect information, and then co-processor 245 can notify main processor subsystem 250, for example, by generating an interrupt to the main processor. In some examples, co-processor 240 can notify main processor subsystem 250 of the occurrence of the local exception through the direct physically connected pins. In some examples, co-processor 240 can notify main processor subsystem 250 of the local exception by sending a message to main processor 270 with information of the particular exception. The message can be, for example, a direct memory access (DMA) message. Such information may include, but is not limited to, an exception address in the co-processor's RAM memory address space, an exception type, and/or both the exception address and exception type.

Upon receiving the co-processor exception notification from co-processor 240 in the co-processor subsystem 210, main processor 270 in the main processor subsystem 250 can parse the co-processor exception notification, and execute corresponding instructions in main-processor exception handler 275. Conventionally, the main processor 270 will either save the entire RAM memory space to a persistence storage or save a few register values. In the new architecture consistent with IEEE 802.11ax standard, the entire RAM memory space is too large to be saved in the persistence storage in the WAPs. In addition, saving only a few register values provides insufficient information for the debugging of the co-processor generated exceptions.

Main processor subsystem 270 may receive, from a plurality of co-processor subsystems, a plurality of co-processor exceptions, e.g., co-processor exception 1 261, co-processor exception 2 262, co-processor exception 3 263, co-processor exception 4 264, etc. According to examples of the present disclosure, main processor 270 first determines, from a plurality of co-processor subsystems, a co-processor subsystem 210 that generates a particular local exception (e.g., co-processor exception 1 261). Then, the main processor subsystem 250 identifies a virtual (or logical) segment of RAM corresponding to the co-processor subsystem 210. For example, where co-processor subsystem 210 is a WLAN co-processor, the main processor 270 may determine the co-processor subsystem 210 as the generator of a particular co-processor exception, and may further identify segment 150 in DDR memory 130 in FIG. 1 as the virtual and/or logical segment of RAM corresponding to the co-processor subsystem 210. In some examples, the main processor subsystem 250 can identify the source of the exception from an interrupt line physically connected from co-processor 210 to the main processor 270.

The main processor exception handler 275 can then create an image of only the virtual and/or logical segment of RAM space corresponding to the co-processor subsystem 210, and save the image to the persistence storage in the WAP. Since the co-processor memory content (which is stored in, e.g., the virtual and/or logical segment of RAM space corresponding to co-processor subsystem 210) is limited, the main processor exception handler 275 is able to be store the image of the virtual and/or logical segment of RAM to the persistent storage. The stored image in the persistent storage can then be used to decode the exception and analyze the cause of the exception.

For illustration purposes only, assuming that a WAP includes 1 GB of RAM space and 512 MB of flash memory space with a main processor and two co-processors, such as, an Ethernet co-processor and a WLAN co-processor. Each co-processor can run in its own reserved virtual memory segments. Note that the addresses illustrated in this example are virtual RAM addresses. In some examples, the main processor may bind a virtual RAM address to a direct memory access (DMA) address. The co-processors and the main processor can use the DMA addresses to pass information to pass information regarding exceptions between each other.

Table 1 below illustrates an example allocation of the virtual RAM memory segments in this particular example.

TABLE 1

| Processor type | Virtual RAM Segment Size | Example Allocated RAM Addresses |
| --- | --- | --- |
| Ethernet co-processor | 16 MB | 0x0x40000000-0x41000000 |
| CPU filesystem | 160 MB | 0x41000000-0x4AFFFFFF |
| WLAN co-processor | 96 MB | 0x4B000000-0x51000000 |
| CPU main processor | 763 MB | 0x51000000-0x80000000 |

In this example virtual RAM allocation, Ethernet co-processor is allocated a memory size of approximately 16 MB in the memory address space 0x0x40000000-0x41000000 for storing Ethernet firmware. Also, the CPU is allocated a memory size of approximately 160 MB for its file system. The entire image of the CPU's file system may be compressed to approximately 128 MB in the address space 0x41000000-0x4AFFFFFF. The compressed file system image may be stored in a flash memory. Furthermore, the WLAN co-processor may be allocated a memory size of approximately 96 MB in the memory address space 0x4B000000-0x51000000 for storing WLAN firmware. Finally, the CPU main processor may occupy a memory size of approximately 763 MB for its operation. Thus, in this example, there are 384 MB of available flash memory, which is derived from deducting the flash memory compress size (128 MB) from the total flash size (512 MB). When an exception occurs, the main processor cannot save all of the RAM allocated to Ethernet co-processor (16 MB), WLAN co-processor (96 MB), and CPU main processor (763 MB) to the flash memory (384 MB available).

Note that although different virtual RAM memory spaces are allocated to different types of co-processors in a system compliant with IEEE 802.11ax architecture, the main processor has access to all of the virtual RAM memory spaces defined in Table 1. Each virtual RAM memory address space is reserved for a particular co-processor by the main processor. In some examples, each co-processor may be allocated a same size of virtual RAM memory address space by the main processor. In other examples, each co-processor may be allocated a different size of virtual RAM memory address space by the main processor. Then, each co-processor can execute instructions, data, and/or codes stored within its reserved virtual RAM memory address space to perform various co-processor functionalities.

According to examples of the present disclosure, when an exception occurs, the co-processor at fault will report the exception to the main processor and then enter into an interrupt state. Thereafter, the main processor can determine a RAM memory address location related to the exception. Then, the main processor can detect a particular memory segment within which the exception occurred based on the RAM memory address location. Specifically, in the RAM allocation example described above in Table 1, if a program counter of the exception address occurred within the memory address space 0x0x40000000-0x41000000, the main processor's exception handler can determine that the exception occurs in the memory address space corresponding to the Ethernet co-processor. As used herein, a "program counter" may refer to an instruction address within a co-processor's reserved RAM memory address space. In some examples, the identification of the corresponding co-processor may be determined based on an offset of the program counter upon occurrence of the exception. In some examples, the identification of the corresponding co-processor can be based on an interrupt line upon the occurrence of the exception. Next, the main processor will store an image of the entire memory segment allocated to the Ethernet co-processor (e.g., 16 MB in the memory address space 0x0x40000000-0x41000000) to the flash memory. Because the size of the image (16 MB) is significantly less than the size of conventional image of an entire RAM, there would be sufficient flash memory space to store the image. Also, because the stored image contains the entire segment of Ethernet co-processor's allocated RAM, the Ethernet co-processor's exception handler can use this stored image in the flash memory to decode the exception. By only storing the image of the memory segment related to the exception, the system addresses the limitation of flash memory size and allows for decoding of an exception occurred in the main processor and/or any of the co-processors. This approach is better than compressing the entire RAM into a size smaller than the size limitation of the flash memory. This is because the virtual RAM memory address space may include a random number of disjoint physical memory segments, which makes it difficult to compress the RAM memory efficiently and effectively.

Figure 3:
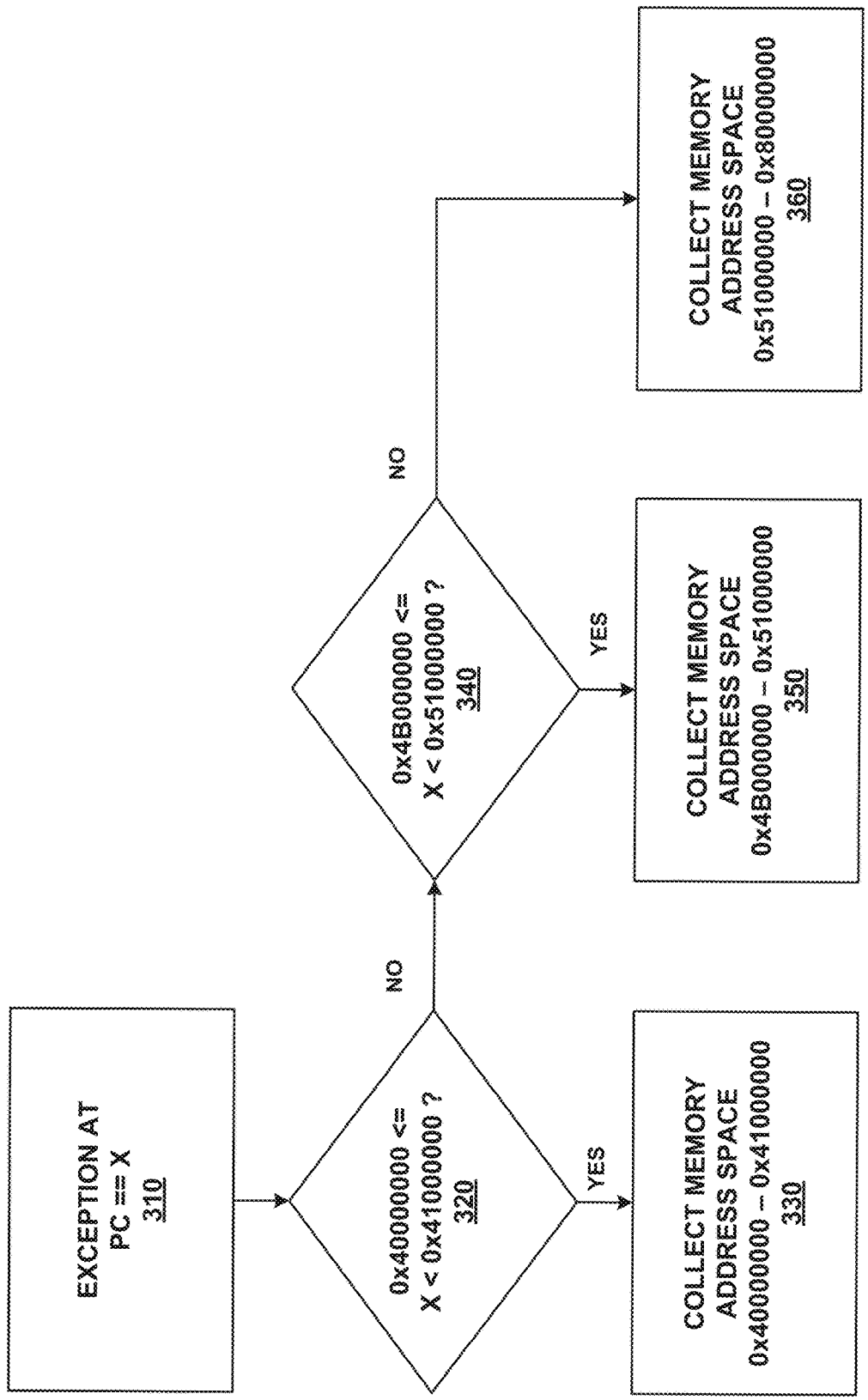
FIG. 3 is a flowchart of an example process of selective memory imaging in the exception handling in WAPs according to the present disclosure.

FIG. 3 is a flowchart of an example process of exception handling at a main processor of a WAP consistent with an architecture defined in IEEE 802.11ax standards. The example process illustrated in FIG. 3 assumes that the main processor of the WAP allocate the virtual RAM memory spaces to at least an Ethernet co-processor and a WLAN co-processor per Table 1. During operations, an example network device (e.g., a WAP in a WLAN) can detect an exception. Once an exception (e.g., an exception previously defined by a co-processor) is detected, the co-processor may generate an interrupt and notify the main processor through the interrupt of the occurrence of the exception. After notifying the main processor, the co-processor at fault may proceed to enter into an interrupt state. Next, the main processor, upon receiving the interrupt, reads the program counter of the co-processor from which the interrupt is received. The main processor of the WAP then determines at 310 from the interrupt that the exception occurred with a program counter pointing at a virtual RAM address X. At 320, the main processor of the WAP determines whether the program counter's value X belongs to the virtual RAM memory space range 0x40000000<=X<0x41000000. If the program counter's value X belongs to the virtual RAM memory space range 0x40000000<=X<0x41000000, at 330, the main processor of the WAP proceeds to collect memory address space corresponding to 0x40000000-0x41000000. If the program counter's value X doesn't belong to the virtual RAM memory space range 0x40000000<=X<0x41000000, the main processor of the WAP determines, at 340, whether the program counter's value X belongs to the virtual RAM memory space range 0x4B000000<=X<0x51000000. If the program counter's value X belongs to the virtual RAM memory space range 0x4B000000<=X<0x51000000, at 350, the main processor of the WAP proceeds to collect memory address space corresponding to 0x4B000000-0x51000000. If the program counter's value X doesn't belong to the virtual RAM memory space range 0x4B000000<=X<0x51000000, at 360, the main processor of the WAP proceeds to collect memory address space corresponding to 0x51000000-0x80000000.

Figure 4:
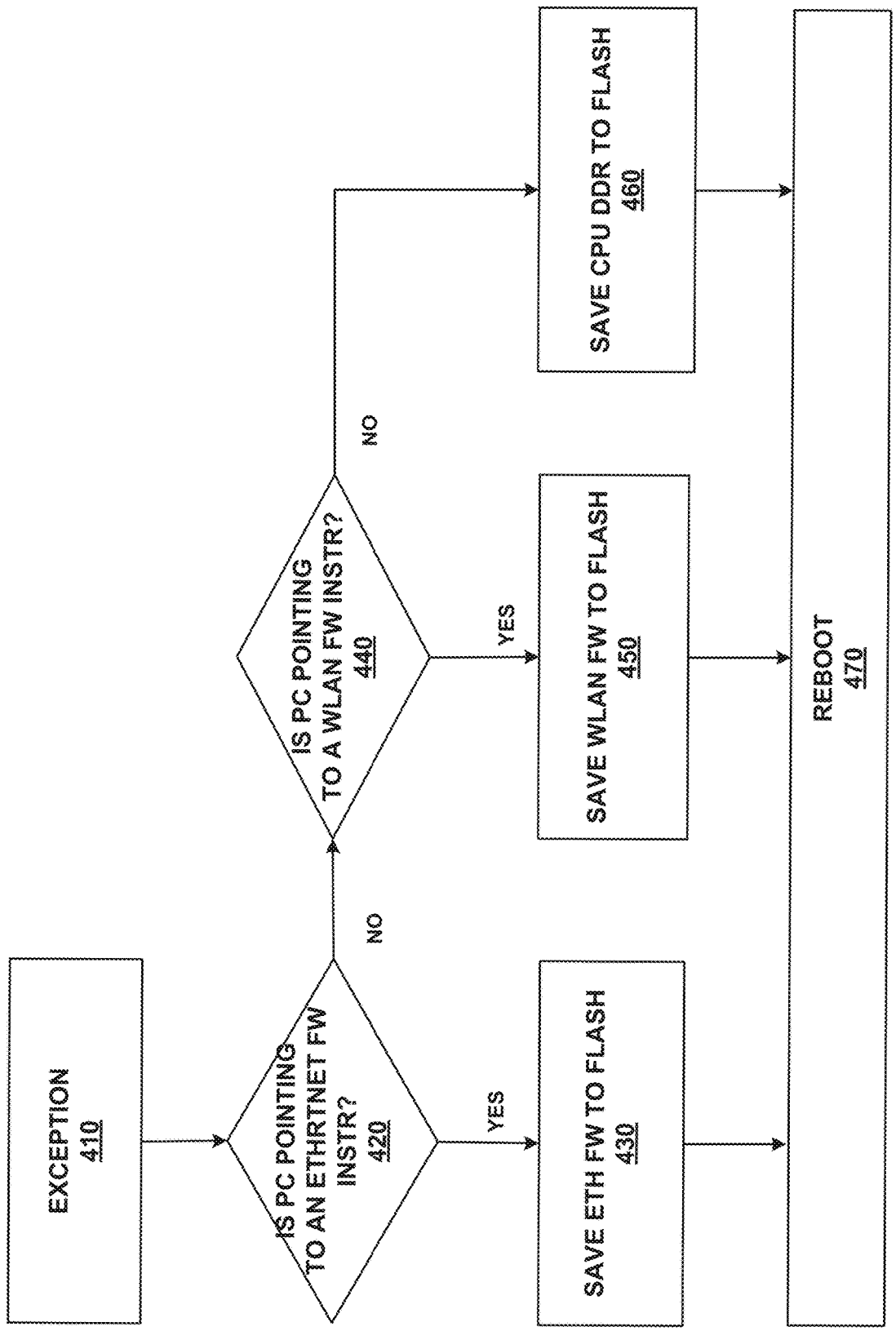
FIG. 4 is a flowchart of an example process of exception handling in the WAPs according to the present disclosure.

FIG. 4 is a flowchart of an example process of exception handling at a main processor of a WAP consistent with an architecture defined in IEEE 802.11ax standards. The example process illustrated in FIG. 4 assumes that the WAP includes a single main processor and at least two co-processors, namely an Ethernet co-processor executing Ethernet firmware instructions and a WLAN co-processor executing WLAN firmware instructions that are stored in the RAM. At 410, the main processor of the WAP receives a notification of an exception. Next, the main processor of the WAP determines whether the program counter is pointing to an Ethernet firmware instruction at 420. Specifically, the main processor of the WAP can determine that the program counter is pointing to the Ethernet firmware instruction by comparing the virtual RAM address corresponding to the program counter to the virtual RAM address space that the main processor has allocated to the Ethernet firmware. If the current address of the program counter is located within the virtual RAM address space allocated to the Ethernet firmware, then the program counter is determined to be pointing to an Ethernet firmware instruction.

If the program counter is pointing to an Ethernet firmware instruction, then the main processor proceeds to save the RAM segments corresponding to the virtual RAM address space allocated to the Ethernet firmware to the flash memory at 430. On the other hand, if the program counter is not pointing to an Ethernet firmware instruction, then the main processor of the WAP determines whether the program counter is pointing to a WLAN firmware instruction at 440. Specifically, the main processor of the WAP can determine that the program counter is pointing to the WLAN firmware instruction by comparing the virtual RAM address corresponding to the program counter to the virtual RAM address space that the main processor has allocated to the WLAN firmware. If the current address of the program counter is located within the virtual RAM address space allocated to the WLAN firmware, then the program counter is determined to be pointing to a WLAN firmware instruction.

If the program counter is pointing to a WLAN firmware instruction, then the main processor proceeds to save the RAM segments corresponding to the virtual RAM address space allocated to the WLAN firmware to the flash memory at 450. If, however, the program counter is pointing to neither an Ethernet firmware instruction nor a WLAN firmware instruction, then the main processor of the WAP proceeds to save the CPU DDR to the flash memory at 460. Upon saving the corresponding memory segments to the flash memory at 430, 450, and/or 460, the main processor of the WAP proceeds to reboot the WAP at 470.

Note that although FIG. 4 uses flash memory as an example to illustrate how memory segments can be saved by the main processor upon receipt of an exception, any other medium can be used in a similar fashion. This includes, but is not limited to, a Trivial File Transfer Protocol (TFTP) server, a network controller, a cloud server, etc.

In some examples, when the size of the memory segment allocated to a particular co-processor relevant to an exception exceeds the size of flash memory (or any other local and/or fast access memory), the main processor may save a first portion of the memory segment to the flash memory, and save a second and different portion of the memory segment to a secondary external memory storage, such as a Trivial File Transfer Protocol (TFTP) server, a network controller, a cloud server, etc. In some examples, the second portion may overlap with the first portion of the memory saved to the flash memory. In other examples, the second portion may not overlap with any of the first portion saved to the flash memory. In some examples, the main processor may compress the second portion of the memory segments prior to saving them to the secondary external memory storage. Note that the main processor saves the first portion of the memory segments to the flash memory (or other local and/or fast access memory) without compression to ensure a high processing speed for the exception handling.

The main processor may determine, based at least in part on the program counter's current location upon occurrence of the exception and/or interrupt, which segments allocated to a particular co-processor are likely to be relevant to the exception handling process. If the total size of the flash memory is insufficient to save all of the memory segments allocated to a particular co-processor relevant to an exception, the main processor may select the first portion of the memory segments to save to the flash memory based on the determination of which segments are likely to be relevant to the exception handling process.

Figure 5:
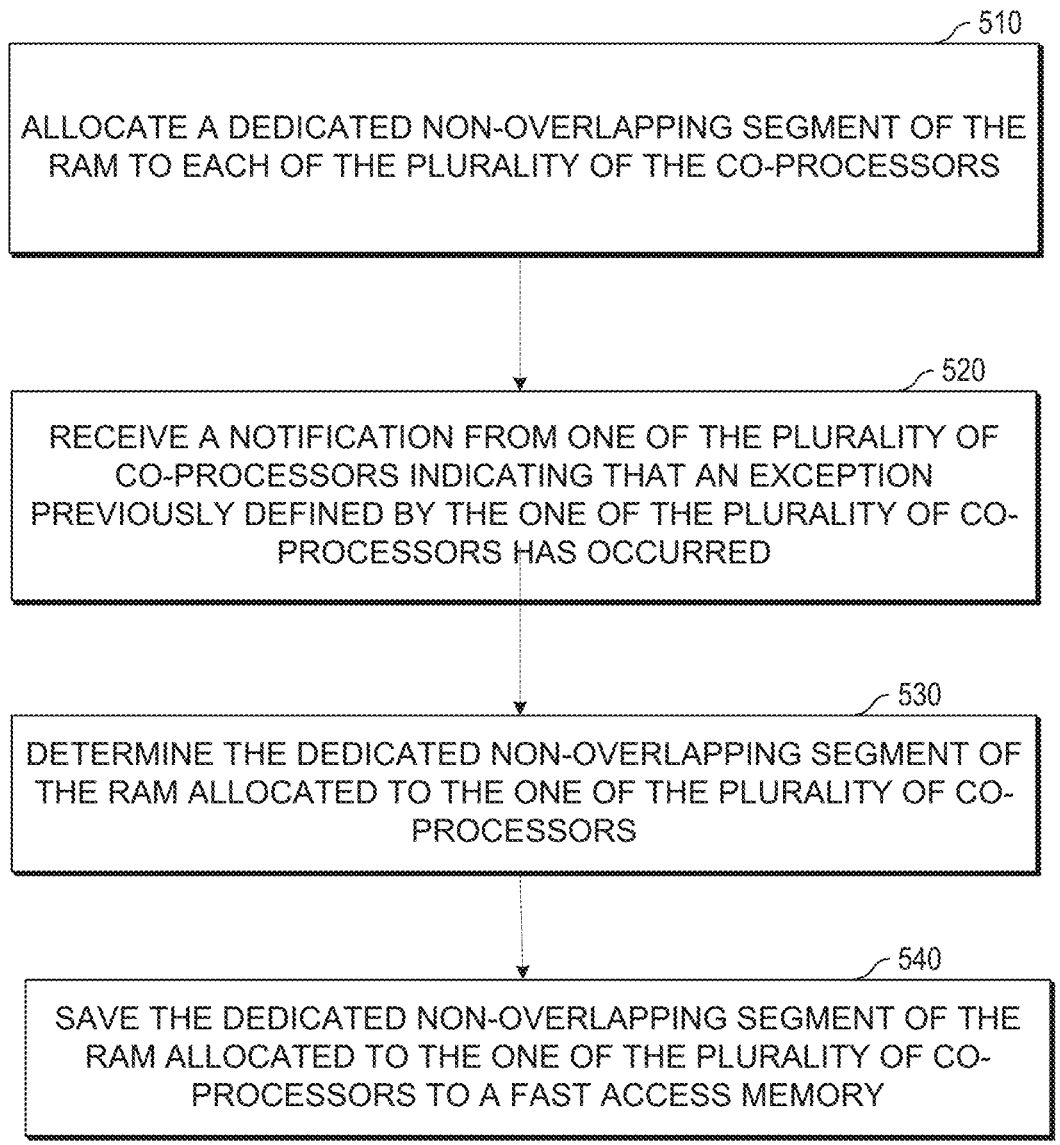
FIG. 5 is a flowchart of an example process of exception handling according to the present disclosure.

FIG. 5 is a flowchart of an example process of exception handling according to the present disclosure. During operations, a main processor of a wireless access point (WAP) may allocate a dedicated non-overlapping segment of the RAM to each of the plurality of the co-processors (operation 510). The WAP includes at least the main processor and a plurality of co-processors. Also, the main processor and the plurality of co-processors both have access to a random-access memory (RAM) co-located within the WAP. Next, the main processor of the WAP may receive a notification from one of the plurality of co-processors indicating that an exception previously defined by the one of the plurality of co-processors has occurred (operation 520). In some examples, the notification is sent through direct pins that connect the main processor and the one of the plurality of co-processors. In other examples, the notification is sent through a message, such as a direct memory access (DMA) message, to indicate information about the exception. Such information may include, but is not limited to, an exception address in the co-processor's RAM memory address space, an exception type, and/or both the exception address and the exception type.

Further, the main processor of the WAP may determine the dedicated non-overlapping segment of the RAM allocated to the one of the plurality of co-processors (operation 530). Then, the main processor of the WAP may save the dedicated non-overlapping segment of the RAM allocated to the one of the plurality of co-processors to a fast access memory (operation 540).

In some examples, saving the dedicated non-overlapping segment of the RAM is performed without saving entirety of the RAM to the fast access memory. In some examples, the fast access memory may include a flash memory.

In some examples, the plurality of co-processors may include at least an Ethernet co-processor and a wireless local area network (WLAN) co-processor. In such examples, the main processor of the WAP may further determine whether a program counter is pointing to an Ethernet firmware instruction. In response to the program counter pointing to the Ethernet firmware instruction, the main processor of the WAP may save the dedicated non-overlapping memory segment of the RAM allocated to the Ethernet co-processor to a flash memory. In addition, in the above examples, the main processor of the WAP may also determine whether a program counter is pointing to a WLAN firmware instruction. In response to the program counter pointing to the WLAN firmware instruction, the main processor of the WAP may save the dedicated non-overlapping memory segment of the RAM allocated to the WLAN co-processor to a flash memory. In some examples, in response to the program counter pointing to neither an Ethernet firmware instruction nor a WLAN firmware instruction, the main processor of the WAP may save the dedicated non-overlapping memory segment of the RAM corresponding to the main processor to a flash memory.

In some examples, when the size of the dedicated non-overlapping segment of the RAM exceeds the size of the fast access memory, the main processor of the WAP may save a first portion of the dedicated non-overlapping segment of the RAM allocated to the one of the plurality of co-processors to the fast access memory. Additionally, the main processor of the WAP may save a second portion of the dedicated non-overlapping segment of the RAM allocated to the one of the plurality of co-processors to a secondary external memory. Here, the second portion is different from the first portion; and the first portion may be determined by the main processor of the WAP to be likely relevant to the exception previously defined by the one of the plurality of co-processors. The secondary external memory may include one or more of: an external flash memory drive, a Trivial File Transfer Protocol (TFTP) server, a network controller, a cloud server, etc.

Figure 6:
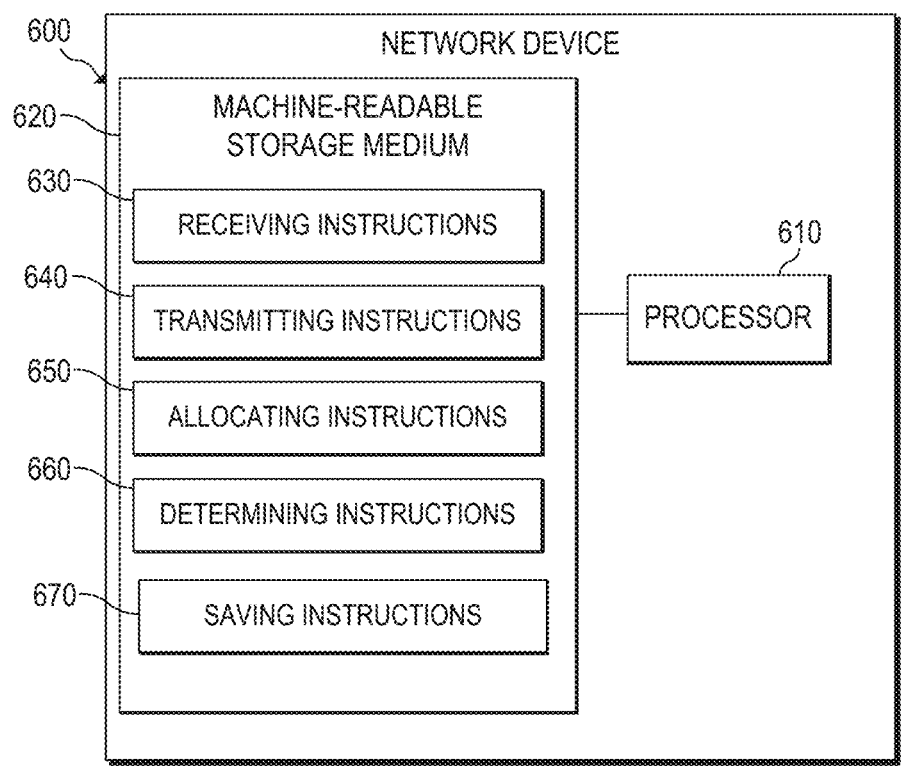
FIG. 6 is a block diagram of an example WAP to handle exceptions according to the present disclosure.

FIG. 6 is a block diagram of an example network device to handle exceptions in a WAP according to the present disclosure. As used herein, a network device (e.g., a WAP) may be implemented, at least in part, by a combination of hardware and programming. For example, the hardware may comprise at least one processor (e.g., processor 610 which may include one main processor and a plurality of co-processors) and the programming may comprise instructions, executable by the processor(s), stored on at least one machine-readable storage medium (e.g., 620). In addition, a network device may also include embedded memory and a software that can be executed in a host system and serve as a driver of the embedded memory. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof.

The at least one processor 610 may fetch, decode, and execute instructions stored on storage medium 620 to perform the functionalities described below in relation to receiving instructions 630, transmitting instructions 640, allocating instructions 650, determining instructions 660, and saving instructions 670. In other examples, the functionalities of any of the instructions of storage medium 620 may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the example of FIG. 6, storage medium 620 may be implemented by one machine-readable storage medium, or multiple machine-readable storage media.

Although network device 600 includes at least one processor 610 and machine-readable storage medium 620, it may also include other suitable components, such as additional processing component(s) (e.g., processor(s), ASIC(s), etc.), storage (e.g., storage drive(s), etc.), or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

Specifically, instructions 630-670 may be executed by processor 610 to: allocating a dedicated non-overlapping segment of the RAM to each of the plurality of the co-processors; receiving a notification from one of the plurality of co-processors indicating that an exception previously defined by the one of the plurality of co-processors has occurred; determining the dedicated non-overlapping segment of the RAM allocated to the one of the plurality of co-processors; saving the dedicated non-overlapping segment of the RAM allocated to the one of the plurality of co-processors to a fast access memory; determining whether a program counter is pointing to an Ethernet firmware instruction; saving the dedicated non-overlapping memory segment of the RAM allocated to the Ethernet co-processor to a flash memory in response to the program counter pointing to the Ethernet firmware instruction; determining whether a program counter is pointing to a WLAN firmware instruction; saving the dedicated non-overlapping memory segment of the RAM allocated to the WLAN co-processor to a flash memory in response to the program counter pointing to the WLAN firmware instruction; saving the dedicated non-overlapping memory segment of the RAM corresponding to the main processor to a flash memory in response to the program counter pointing to neither an Ethernet firmware instruction nor a WLAN firmware instruction; saving a first portion of the dedicated non-overlapping segment of the RAM allocated to the one of the plurality of co-processors to the fast access memory; saving a second portion of the dedicated non-overlapping segment of the RAM allocated to the one of the plurality of co-processors to a secondary external memory, wherein the second portion is different from the first portion, and wherein the first portion is determined by the main processor is be likely relevant to the exception previously defined by the one of the plurality of co-processors; etc.

We claim:

1. A method comprising:
   allocating, by a main processor of a wireless access point (WAP) comprising at least the main processor and a plurality of co-processors wherein the main processor and the plurality of co-processors both have access to a random-access memory (RAM) co-located within the WAP, a dedicated non-overlapping segment of the RAM to each of the plurality of the co-processors;
   receiving, by the main processor of the WAP, a notification from one of the plurality of co-processors indicating that an exception previously defined by the one of the plurality of co-processors has occurred;
   determining, by the main processor of the WAP, the dedicated non-overlapping segment of the RAM allocated to the one of the plurality of co-processors; and
   saving, by the main processor of the WAP, the dedicated non-overlapping segment of the RAM allocated to the one of the plurality of co-processors to a fast access memory.

2. The method of claim 1, wherein saving the dedicated non-overlapping segment of the RAM is performed without saving entirety of the RAM to the fast access memory.

3. The method of claim 1, wherein the fast access memory comprises a flash memory.

4. The method of claim 1, wherein the plurality of co-processors comprise at least an Ethernet co-processor and a wireless local area network (WLAN) co-processor.

5. The method of claim 4, further comprising:
determining, by the main processor, whether a program counter is pointing to an Ethernet firmware instruction; and
in response to the program counter pointing to the Ethernet firmware instruction, saving the dedicated non-overlapping memory segment of the RAM allocated to the Ethernet co-processor to a flash memory.

6. The method of claim 4, further comprising:
determining, by the main processor, whether a program counter is pointing to a WLAN firmware instruction; and
in response to the program counter pointing to the WLAN firmware instruction, saving the dedicated non-overlapping memory segment of the RAM allocated to the WLAN co-processor to a flash memory.

7. The method of claim 4, further comprising:
in response to a program counter pointing to neither an Ethernet firmware instruction nor a WLAN firmware instruction, saving the dedicated non-overlapping memory segment of the RAM corresponding to the main processor to a flash memory.

8. The method of claim 1, further comprising:
saving a first portion of the dedicated non-overlapping segment of the RAM allocated to the one of the plurality of co-processors to the fast access memory; and
saving a second portion of the dedicated non-overlapping segment of the RAM allocated to the one of the plurality of co-processors to a secondary external memory, wherein the second portion is different from the first portion, and wherein the first portion is determined by the main processor to be likely relevant to the exception previously defined by the one of the plurality of co-processors.

9. The method of claim 8, wherein the secondary external memory comprises one or more of: an external flash memory drive, a Trivial File Transfer Protocol (TFTP) server, a network controller, and a cloud server.

10. A wireless access point (WAP) comprising at least:
a random-access memory (RAM);
a central processing unit (CPU) comprising at least a main processor and a plurality of co-processors, the main processor of the CPU executing instructions from the RAM to:
allocate a dedicated non-overlapping segment of the RAM to each of the plurality of the co-processors;
receive a notification from one of the plurality of co-processors indicating that an exception previously defined by the one of the plurality of co-processors has occurred;
determine the dedicated non-overlapping segment of the RAM allocated to the one of the plurality of co-processors; and
save the dedicated non-overlapping segment of the RAM allocated to the one of the plurality of co-processors to a fast access memory,
wherein the main processor and the plurality of co-processors both have access to the RAM co-located within the WAP.

11. The WAP of claim 10, wherein saving the dedicated non-overlapping segment of the RAM is performed without saving entirety of the RAM to the fast access memory.

12. The WAP of claim 10, wherein the fast access memory comprises a flash memory.

13. The WAP of claim 10, wherein the plurality of co-processors comprise at least an Ethernet co-processor and a wireless local area network (WLAN) co-processor.

14. The WAP of claim 13, wherein the main processor of the CPU further executes instructions from the RAM to:
determine whether a program counter is pointing to an Ethernet firmware instruction; and
save the dedicated non-overlapping memory segment of the RAM allocated to the Ethernet co-processor to a flash memory in response to the program counter pointing to the Ethernet firmware instruction.

15. The WAP of claim 13, wherein the main processor of the CPU further executes instructions from the RAM to:
determine whether a program counter is pointing to a WLAN firmware instruction; and
save the dedicated non-overlapping memory segment of the RAM allocated to the WLAN co-processor to a flash memory in response to the program counter pointing to the WLAN firmware instruction.

16. The WAP of claim 13, wherein the main processor of the CPU further executes instructions from the RAM to:
save the dedicated non-overlapping memory segment of the RAM corresponding to the main processor to a flash memory in response to a program counter pointing to neither an Ethernet firmware instruction nor a WLAN firmware instruction.

17. The WAP of claim 10, wherein the main processor of the CPU further executes instructions from the RAM to:
save a first portion of the dedicated non-overlapping segment of the RAM allocated to the one of the plurality of co-processors to the fast access memory; and
save a second portion of the dedicated non-overlapping segment of the RAM allocated to the one of the plurality of co-processors to a secondary external memory, wherein the second portion is different from the first portion, and wherein the first portion is determined by the main processor to be likely relevant to the exception previously defined by the one of the plurality of co-processors.

18. The WAP of claim 17, wherein the secondary external memory comprises one or more of: an external flash memory drive, a Trivial File Transfer Protocol (TFTP) server, a network controller, and a cloud server.

19. A non-transitory machine-readable storage medium encoded with instructions executable by a main processor of central processing unit (CPU) of a wireless access point (WAP), the CPU comprising at least the main processor and a plurality of co-processors, the non-transitory machine-readable storage medium comprising instructions to:
allocate a dedicated non-overlapping segment of a random-access memory (RAM) to each of the plurality of the co-processors;
receive a notification from one of the plurality of co-processors indicating that an exception previously defined by the one of the plurality of co-processors has occurred;

determine the dedicated non-overlapping segment of the RAM allocated to the one of the plurality of co-processors; and save the dedicated non-overlapping segment of the RAM allocated to the one of the plurality of co-processors to a fast access memory.

20. The non-transitory machine-readable storage medium of claim 19, further comprising instructions to:

save a first portion of the dedicated non-overlapping segment of the RAM allocated to the one of the plurality of co-processors to the fast access memory; and save a second portion of the dedicated non-overlapping segment of the RAM allocated to the one of the plurality of co-processors to a secondary external memory, wherein the second portion is different from the first portion, and wherein the first portion is determined by the main processor to be likely relevant to the exception previously defined by the one of the plurality of co-processors.

* * * * *